May 7, 1935. P. E. MATTHEWS 2,000,709
REAR ENGINE DRIVE FOR SELF PROPELLED VEHICLES
Filed July 14, 1934  3 Sheets-Sheet 3

INVENTOR:
Philip E. Matthews
BY
Redding, Greeley, O'Shea & Campbell
HIS ATTORNEYS Patented May 7, 1935

2,000,709

UNITED STATES PATENT OFFICE 2,000,709

REAR ENGINE DRIVE FOR SELF-PRO-
PELLED VEHICLES

Philip E. Matthews, Plainfield, N. J., assignor to
International Motor Company, New York, N. Y.,
a corporation of Delaware Application July 14, 1934, Serial No. 735,115

3 Claims. (Cl. 180—54)

Automotive engineers have recently given considerable attention to the possible advantages of placing the engine for self-propelled vehicles at the rear end of the chassis instead of at the front end. Such proposals have concerned themselves not only with so-called pleasure cars but also commercial vehicles such as busses. The transfer is not as simple as the proposal seems on its face. It involves problems which have yet to be solved to assure practical success. Limitations of space, weight and accessibility at once present themselves in direct conflict with mechanical requirements of power, speed and efficiency. For instance, taking the modern bus as an illustration, the overall width and length of the body is generally regulated by State laws. From the operator's standpoint maximum seating capacity is a primary consideration. In the maintenance of the vehicle accessibility to the engine and associated driving gear is a necessity. Confronted with these considerations the problem remains, after satisfying them, of providing adequate power, speed and mechanical efficiency with suitable control by the driver.

Numerous proposals have been advanced but at the sacrifice of one or more of the above recited desiderata. For instance, if an engine be mounted longitudinally of the vehicle at the rear end the overall length is increased or the seating capacity decreased. Accessibility is impaired and weight distribution difficult of attainment. When the engine is placed transversely of the vehicle at the rear end its length is such as to make it difficult to fit in the transmission and clutch in such relation to the final drive gearing on the axle as to give mechanical efficiency. In such an arrangement weight distribution is also difficult of attainment.

It is the principal object of this invention to provide a rear engine drive for vehicles of such a character as to enable adequate power to be developed without sacrifice of seating capacity, weight distribution with reference to the center line of the vehicle to be obtained naturally, mechanical efficiency to be assured by a straight-line drive to the rear axle along the axis of the vehicle, and complete and convenient accessibility for the engines, the clutch and the transmission to be assured without the sacrifice of any other desirable conditions. In accordance with the invention the final drive on the axle is located on the center line of the vehicle and the propeller shaft extends rearwardly therefrom along the center line. The transmission is so located with respect to the propeller shaft as to enable the power to be taken off with maximum efficiency. To meet the problems of required power, compactness and accessibility two engines are mounted at the rear end of the body in alignment but transversely of the vehicle and in symmetrical relationship with respect to the center line of the vehicle. The power from the engines is impressed on a single shaft which is also disposed on the center line of the vehicle and this power is led through a clutch which is disposed rearwardly of the transmission and in such relation to the rear end of the body as to afford instant and complete accessibility. By the construction described the full available width of the body can be utilized while minimum space longitudinally of the body is required. The power developed by the two motors can be raised to maximum limits. The weight of all the parts is naturally placed symmetrically with respect to the center line of the vehicle thereby giving the desired weight distribution without the adoption of special expedients. The power from the engines is delivered to a straight-line shaft disposed on the center line of the vehicle and at right angles to the center lines of the engines.

The invention will be described in greater detail in connection with the embodiment illustrated by way of example in the accompanying drawings, wherein.

Figure 1:
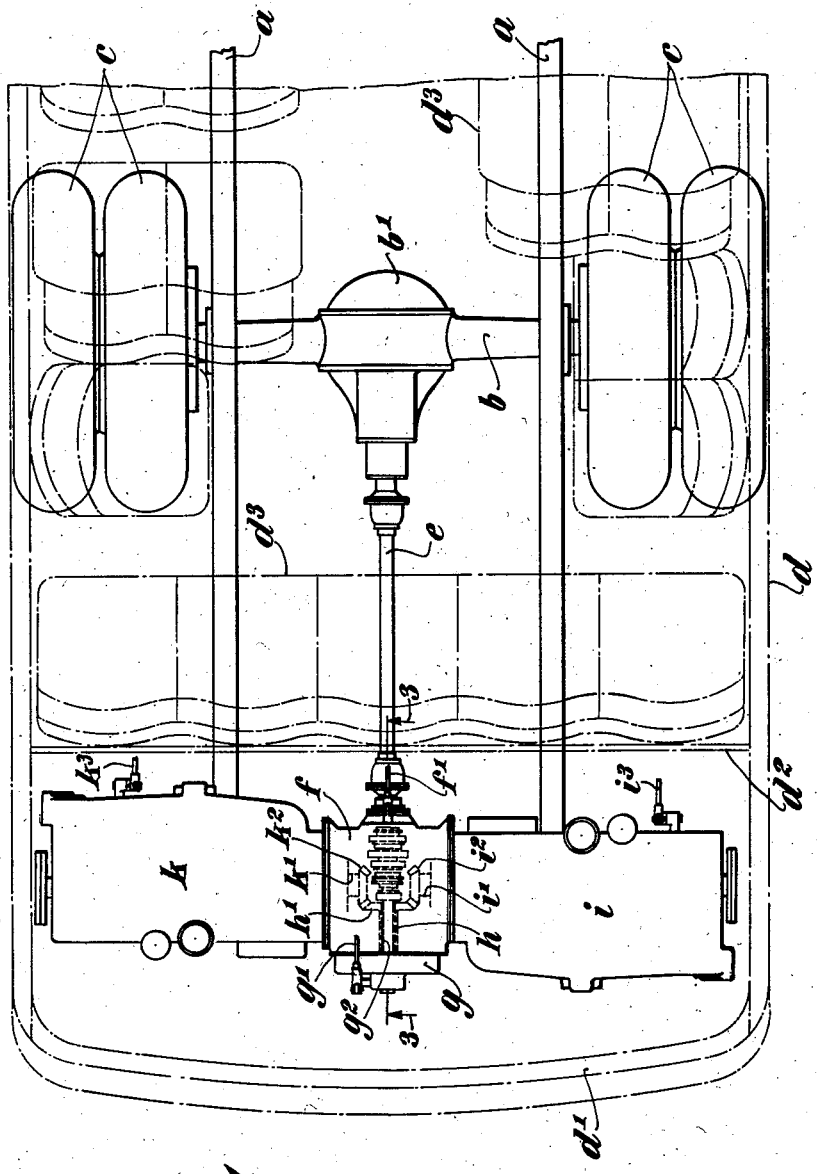
Figure 1 is a somewhat schematic view in plan showing a portion of the rear end of the body of a bus in which the improved rear engine drive is mounted.

While it will be understood as the description proceeds that the invention is not to be limited to the purpose for which the vehicle is employed, it is adapted particularly for use in a modern passenger bus and has been so illustrated. As shown in Figure 1 side frame members of the vehicle are indicated at $a$ being supported on a rear axle $b$, the housing for the differential in the axle being shown at $b'$ and the vehicle wheels at c. The fragment of the bus body is shown at d, the rear wall having a panel therein indicated at d' which may be removable. The passenger compartment may end at a transverse partition $d^2$, the seats $d^3$ within the body being disposed forwardly thereof. There is thus formed at the rear end of the body a minimum space determined by the width of the body as permitted by State laws and the distance between the partition $d^2$ and the rear panel d' which should be as short as possible for the purpose of housing the driving units while permitting the greatest possible length within the passenger compartment. Extending rearwardly from the final drive housed within the casing b' (the details of which need not be illustrated as they are well known) is a propeller shaft e. It is preferable to locate the final drive on the center line of the vehicle and also the propeller shaft but this is not made an essential characteristic of the assembly in all of the appended claims because many of the advantages of the invention can be obtained, if it is necessary, in a particular design to dispose the propeller shaft at one side or the other of the center line of the vehicle. However, it is important that the propeller shaft e shall extend longitudinally of the vehicle and not angularly so that a straight-line drive to the differential gear can be employed. The propeller shaft e extends to a suitable transmission (to be later described). The transmission housing is indicated in Figure 1 by the reference character f. At the rear end of the transmission (having reference to the rear end of the vehicle) is mounted a suitable clutch g which may have suitable controls indicated conventionally at g' by which the clutch and associated parts, if any, can be operated by the driver at the forward end of the vehicle. The power transmitted through the clutch is delivered to the transmission by a short shaft $g^2$ also disposed longitudinally of the vehicle. Power is delivered to the clutch through a tubular shaft h on which is keyed a gear h' which receives power from the engines. The two engines i and k are mounted transversely of the vehicle with their crank shafts aligned and the two engines are symmetrically located at opposite sides of the driven tubular shaft h. The crank shafts of the engines are indicated at i', k', respectively, and carry gears $i^2$, $k^2$, respectively, both of which are engaged with the gear h'. Since the crank shafts i', k' are at right angles to the shaft h it is evident that the interposed gearing must be of such a character as to meet the requirements. Simple beveled gearing is illustrated for this purpose. Without going into details within the skill of one in the art there has been indicated conventionally a fragment of a shifter rod f' by which the operator at the front end of the vehicle can control the transmission elements and also rods $i^3$, $k^3$, by which the operator can control the throttles of the respective engines. The present application is not concerned with the details of construction by which the various units are thus controlled.

The improved principle by which the broad results are accomplished is understandable from the embodiment illustrated in Figure 1. The combined power of the engines i, k, may be equal to or greater than the power that can be obtained from a single motor set transversely within the same limited space considered with its necessary associated elements and at the same time the provision of the two motors offers advantages peculiarly desirable in a rear engine drive for self-propelled vehicles. For instance, the symmetrical relationship of all of the parts with respect to the driven shaft $g^2$ assures naturally proper weight distribution. Since each motor is of less horse-power than would be required with a single engine drive, the reciprocating parts are correspondingly lighter as is advantageous and greater flexibility in performance is secured. The straight-line drive shaft e assures maximum mechanical efficiency in the transmission of power. The location of the clutch g at the rear of the transmission f gives complete accessibility when the panel d' is removed. Similarly, the engines i, k, and the transmission f are also fully accessible. The housing b' for the final drive, while preferably disposed on the center line of the vehicle, can be located at any part of the axle between the side frame members a and the units of the drive adapted to such location without loss of the principal advantages of the invention.

Figure 2:
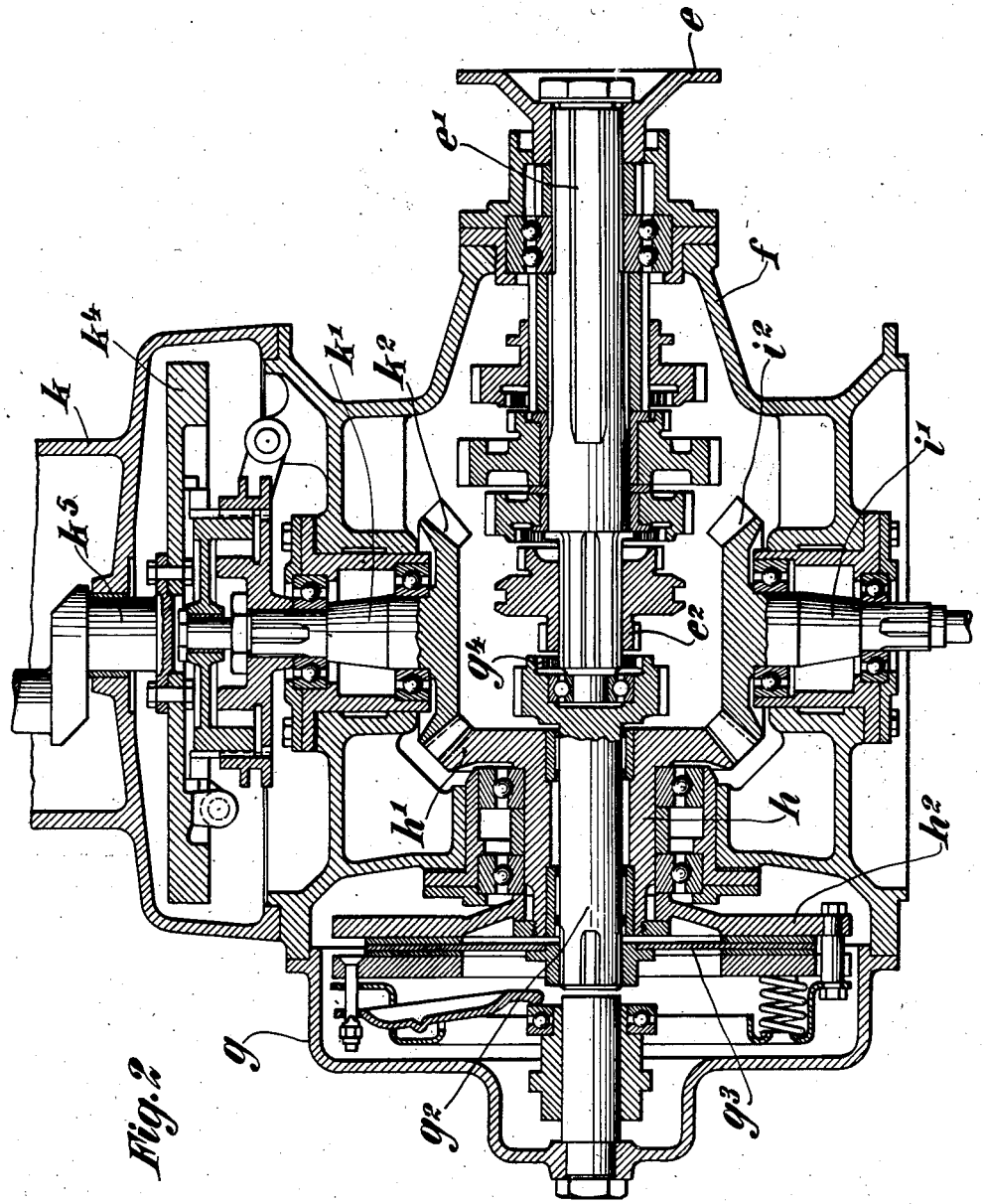
Figure 2 is a horizontal section through the transmission and clutch shown in Figure 1 and taken on the plane indicated by the line 2—2 of Figure 3 and looking in the direction of the arrows.
Figure 3:
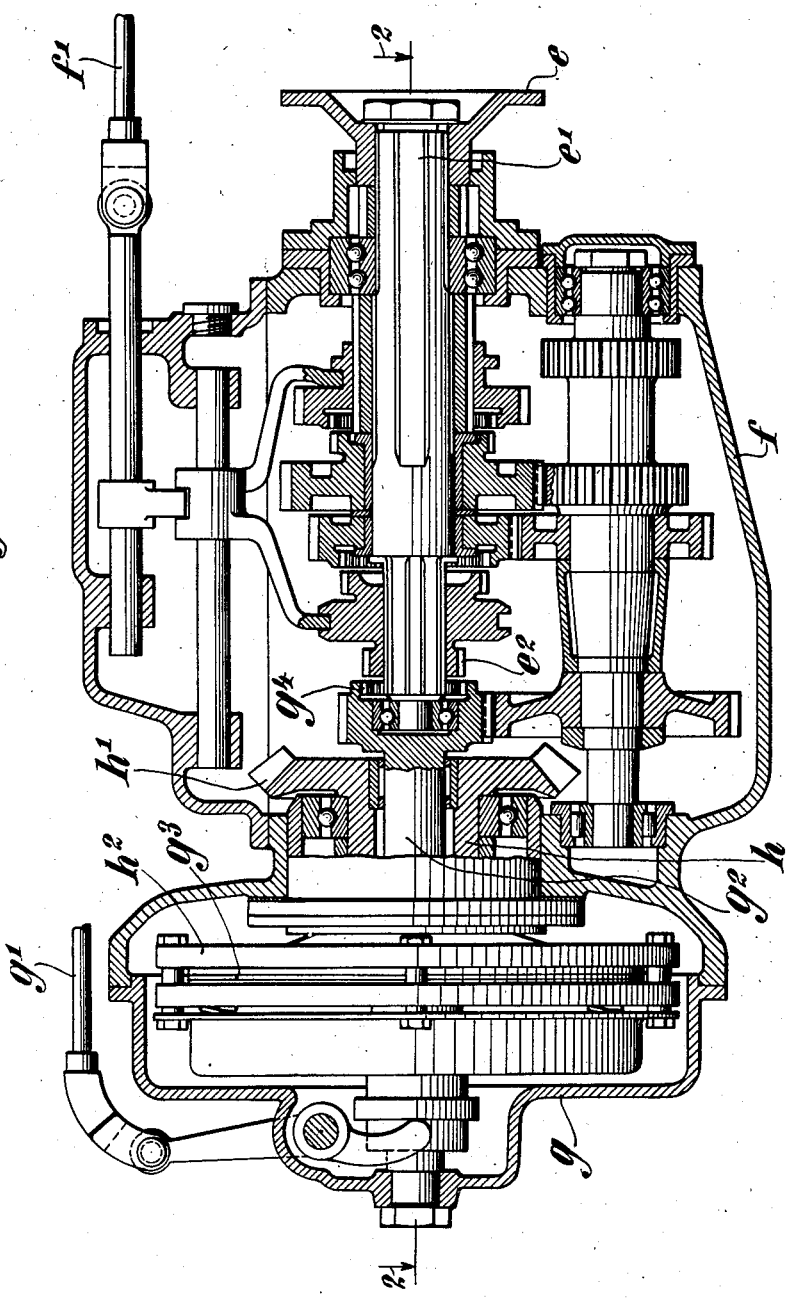
Figure 3 is a view in vertical section through the transmission and clutch shown in Figure 1 and taken on the plane indicated by the line 3—3 of Figure 1 and looking in the direction of the arrows, some of the parts being shown in elevation and some in section to an extent necessary to indicate their relationship.

Referring now to Figures 2 and 3 what has been referred to heretofore as the crank shafts i' and k', appear as short shaft sections driven from the respective crank shafts of the engines because there has been indicated free wheeling mechanism interposed between such shaft sections and their respective crank shafts. Such free wheeling devices constitute no part of the present invention and are suggested merely to indicate that they may or may not be included. As shown in Figure 2 the crank shaft of the engine k is illustrated at $k^5$ and a free wheeling device of any known construction, under the control of the driver, is illustrated generally at $k^4$ and interposed between the crank shaft $k^5$ and the short shaft section k'. One member $h^2$ of the clutch is carried with a hollow tubular shaft h and the driven member $g^3$ is carried with the short shaft section $g^2$, disposed within the tubular shaft h. For maximum efficiency it is proposed in the transmission illustrated to transmit the power of the engines in direct drive to the propeller shaft e through a single set of gears such gears being the beveled gears $i^2$, $k^2$ and h', respectively. To this end, the propeller shaft section e' within the transmission is aligned with the short driven shaft $g^2$ and has splined thereon a gear $e^2$ which can be slid into direct engagement with an internal gear $g^4$ formed on the proximate end of the shaft section $g^2$. When the gears $e^2$, $g^4$, are engaged the engines drive directly to the propeller shaft e as is desirable for maximum efficiency. Other change speed gears which may be of conventional form are emboided within the transmission f but need not be described in detail because the invention is not concerned with the transmission mechanism per se other than that a direct drive through only a single set of gears is preferred.

Changes in details of construction and design affecting the units may be made without departing from the spirit of the invention so long as the broad objects are accomplished by the relationship constituting the underlying principle.

I claim as my invention:

1. In a vehicle having a rear driven axle, side frame members of a chassis supported thereon, final drive gearing in the axle disposed between said side frame members, a propeller shaft extending rearwardly from said final drive gearing parallel to the center line of the vehicle, a rearwardly extending body having a compartment located to the rear of said axle and extending the width of the body, two engines in said compartment disposed symmetrically at opposite sides of the propeller shaft, a transmission located between the proximate ends of said engines and to which said propeller shaft is operatively connected, a clutch located at the rear of the transmission and having a shaft section extending forwardly and in alignment with said propeller shaft, means to engage the said shaft section with said transmission, and a tubular shaft in which said last named shaft section is disposed connected operatively to the clutch and to said engines.

2. In a vehicle having a rear driven axle, side frame members of a chassis supported thereon, final drive gearing in the axle disposed between said side frame members, a propeller shaft extending rearwardly from said final drive gearing parallel to the center line of the vehicle, a rearwardly extending body having a compartment located to the rear of said axle and extending the width of the body, two engines in said compartment disposed symmetrically at opposite sides of the propeller shaft, a change speed transmission located between the proximate ends of said engines and to which said propeller shaft is operatively connected, a clutch located at the rear of the transmission and having a shaft section extending forwardly and in alignment with said propeller shaft, means to engage selectively the propeller shaft with said aligned shaft section through said transmission, and a tubular shaft in which said last named shaft section is disposed connected operatively to the clutch and to said engines.

3. In a self-propelled vehicle in combination with a rear driven axle, a propeller shaft for driving the axle extending rearwardly thereof and along the center line of the vehicle, a shaft section disposed at the rear of the propeller shaft and in alignment therewith, a transmission shaft operatively connected with the rear end of the propeller shaft, a transmission including means to connect the transmission shaft and said shaft section together directly, a clutch connected operatively with the said shaft section, two motors having their crank shafts in alignment and disposed at right angles to the propeller shaft and symmetrically located at opposite sides thereof, and means operatively connecting the said crank shafts with the clutch.

PHILIP E. MATTHEWS.